J. P. LAWRENSON & C. H. KING.
TIRE TIGHTENER OR EXPANDER.
APPLICATION FILED JULY 24, 1914.
1,133,864.
Patented Mar. 30, 1915.
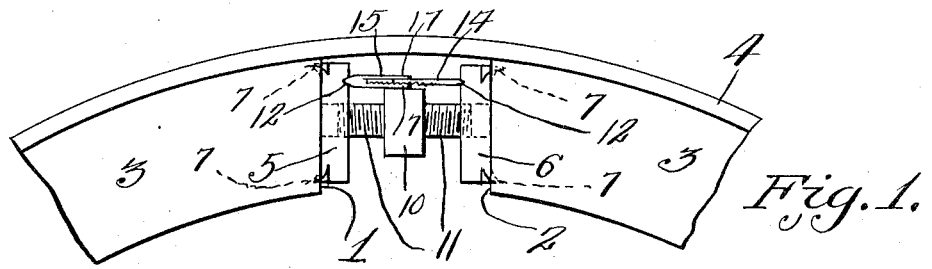
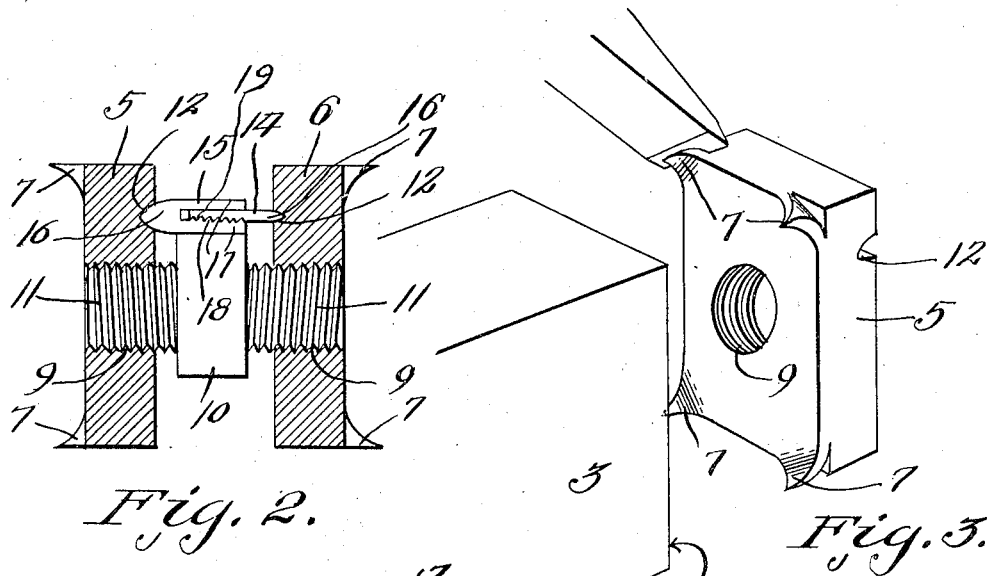
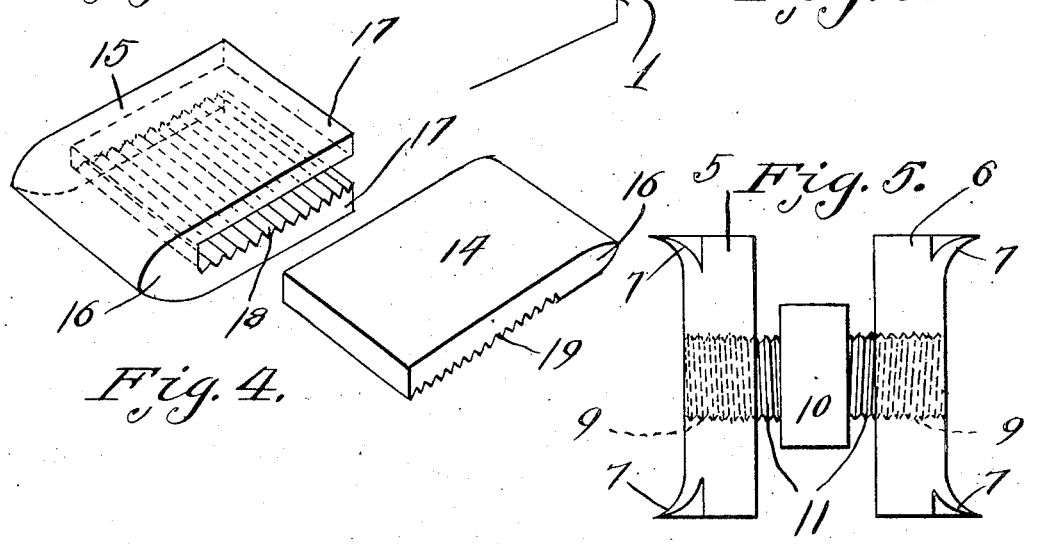
Witnesses
Philip Terrell
Francis G. Boswell
Inventors
J. P. Lawrenson
C. H. King
By D. Swift &c.
Their Attorneys

UNITED STATES PATENT OFFICE.

JUDGE PECK LAWRENSON AND CHARLES HASTINGS KING, OF PALESTINE, TEXAS.

TIRE TIGHTENER OR EXPANDER.

1,133,864.   Specification of Letters Patent.   Patented Mar. 30, 1915.

Application filed July 24, 1914. Serial No. 852,871.

*To all whom it may concern:*

Be it known that we, JUDGE PECK LAWRENSON and CHARLES HASTINGS KING, citizens of the United States, residing at Palestine, in the county of Anderson and State of Texas, have invented a new and useful Tire Tightener or Expander; and we do hereby declare the following to be a full, clear, and exact description of the invention, such as will enable others skilled in the art to which it appertains to make and use the same.

This invention relates to a new and useful tire tightener or expander, and it is the aim of the invention to provide a pair of plates, one disposed adjacent each severed end of a felly of a wheel, and provided with a right and left threaded member having threaded connections with said plates, so that they may be separated, for expanding the felly tight against the tire.

One of the features of the invention is to construct these plates or cut them from stock metal bars of the requisite width and thickness, and by the use of a cold chisel or other tool, the corners adjacent the outer faces of said plate are struck up to engage the severed ends of the felly as shown in the drawings, to prevent displacement of said plate.

Another feature of the invention is the provision of means comprising two interlocked plates engaging recesses of the adjacent faces of said plate and designed to engage a nut of the right and left threaded member, to prevent it unscrewing after having been once adjusted. These interlocked plates also assist in preventing said plates adjacent severed ends of the felly from displacement.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in side elevation of a portion of a felly showing a section having been cut away, and the tire tightener or felly expander disposed between and adjacent the severed ends of the felly, and illustrating the means to prevent the right and left threaded member from unscrewing. Fig. 2 is a vertical sectional view. Fig. 3 is a detail view of one of the severed ends of the felly, showing one of said plates in a position ready to be placed in contact with the severed end, showing the chisel cut or struck up corner lugs, in order to illustrate how said lugs are to engage said felly to prevent displacement of the plate. Fig. 4 is a detail view illustrating the interlocking plates, which are used for preventing unscrewing of the right and left threaded member. Fig. 5 is a view in side elevation illustrating the felly expander or tire tightener, and showing the interlocking plate dispensed with.

Referring more especially to the drawings, 1 and 2 designate the severed ends of the felly 3, and 4 denotes the usual tire.

The felly expander comprises two plates 5 and 6, the corners of the outer faces of which are cut or struck up by means of a cold chisel, to form the lugs 7, which pierce or engage the severed ends of the felly in the manner illustrated in the drawing, to prevent displacement of said plate. The plates 5 and 6 are provided with threaded openings 9, and arranged between the plate is a rectangular member 10, projecting from opposite faces of which are threaded shanks 11, which are alined and designed to engage said threaded openings. The threads of said shanks are right and left, and it will be observed that by the rotation of the rectangular member in one direction or the other, said plates 5 and 6 will separate, thereby causing the felly to expand, and firmly and frictionally causing the same to engage the tire, thereby tightening the tire against the felly.

The adjacent faces of the plates are provided with oppositely arranged transverse recesses 12, and interposed between said plates are plates 14 and 15, the ends 16 of which engage said recesses 12. The plate 15 at one end is provided with forks 17, between which, the plate 14 is received. The inner face of one of the forks 17 is provided with teeth 18, which are engaged by the teeth 19 of the plate 14. In connecting the two plates 14 and 15, in order to fit between said plates 5 and 6, the plate 14 slides transversely of the plate 15, the teeth 18 and 19 registering and engaging one another. When placing the plates 14 and 15 in position, the plate 15 engages one or the other of the flat faces of the rectangular member, thereby preventing its unscrewing, after having been adjusted. In Fig. 5 the plates 14 and 15 are dispensed with, otherwise the structure is the same as shown in the other figures.

The invention having been set forth, what is claimed as new and useful is:—

The combination with a felly of a wheel having severed ends, of a tire surrounding the felly, a pair of spacing plates engaging the severed ends of the felly and provided with threaded openings, the four corners of each plate adjacent its outer face being chiseled or struck up forming lugs to engage each severed end to prevent displacement of each plate, a rectangular member arranged between said plates having oppositely disposed alined right and left threaded shanks engaging said threaded openings, whereby upon rotating said member in one direction or the other said plates are separated to expand the felly against the tire, the adjacent faces of said plates having oppositely arranged recesses, a second pair of plates having adjustable connections engaging said recesses and disposed adjacent and against one of the flat faces of said rectangular member to prevent the same from unscrewing.

In testimony whereof we have signed our names to this specification in the presence of two subscribing witnesses.

JUDGE PECK LAWRENSON.
CHARLES HASTINGS KING.

Witnesses:
B. H. GARDNER,
C. N. SHELTON.